United States Patent
Thangella

(10) Patent No.: US 9,313,822 B2
(45) Date of Patent: Apr. 12, 2016

(54) ENABLING AN INPUT DEVICE SIMULTANEOUSLY WITH MULTIPLE ELECTRONIC DEVICES

(71) Applicant: QUALCOMM Incorporated, San Diego, CA (US)

(72) Inventor: Prudvidhar Reddy Thangella, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 242 days.

(21) Appl. No.: 13/786,791

(22) Filed: Mar. 6, 2013

(65) Prior Publication Data

US 2014/0256257 A1  Sep. 11, 2014

(51) Int. Cl.
- *H04B 7/00* (2006.01)
- *H04W 76/04* (2009.01)
- *H04W 76/02* (2009.01)
- *H04W 84/18* (2009.01)

(52) U.S. Cl.
CPC .......... *H04W 76/046* (2013.01); *H04W 76/025* (2013.01); *H04W 84/18* (2013.01)

(58) Field of Classification Search
CPC ........... G06F 21/74; G06F 2221/2105; H04W 84/18; H04W 7/24
USPC .................. 455/41.2; 345/2.3, 156, 157, 163; 726/19
See application file for complete search history.

(56) References Cited

U.S. PATENT DOCUMENTS

| | | | |
|---|---|---|---|
| 5,990,868 A | 11/1999 | Frederick | |
| 7,162,232 B2* | 1/2007 | Ramakesavan | H04W 76/023 455/186.1 |
| 7,768,389 B2* | 8/2010 | Frank | G06F 3/03543 340/10.1 |
| 8,006,002 B2 | 8/2011 | Kalayjian et al. | |
| 8,015,010 B2 | 9/2011 | Basir | |
| 8,346,985 B2 | 1/2013 | Chassot et al. | |
| 8,624,840 B2* | 1/2014 | Cox | G06F 3/03543 345/156 |
| 8,744,353 B2* | 6/2014 | Hsieh | G06F 3/03543 455/41.2 |

(Continued)

FOREIGN PATENT DOCUMENTS

| | | |
|---|---|---|
| EP | 0794482 A1 | 9/1997 |
| EP | 1388779 A1 | 2/2004 |

(Continued)

OTHER PUBLICATIONS

Gil L., "Logitech's newest bluetooth keyboard makes typing on multiple devices easy: Hands-on accessory review", PadGadget, Nov. 7, 2012, p. 1-10, <URL: http://www.padgadget.com/2012/11/07/logitechs-newest-bluetooth-keyb...ultiple-devices-easy-hands-on-accessory-review/#.UPR_ce6resl.email>.

*Primary Examiner* — Edward Urban
*Assistant Examiner* — Max Mathew
(74) *Attorney, Agent, or Firm* — Austin Rapp & Hardman

(57) ABSTRACT

A method for using an input device simultaneously with multiple electronic devices is described. A first connection is established with a first electronic device. The first connection enters an active mode. A second connection is established with a second electronic device. The second connection enters the active mode. The first connection switches to a standby mode in response to the second connection entering the active mode. The first connection and the second connection switch between the active mode and the standby mode, where only one connection is in the active mode at a time.

47 Claims, 8 Drawing Sheets

(56) References Cited

U.S. PATENT DOCUMENTS

| | | |
|---|---|---|
| 2004/0113890 A1 | 6/2004 | Ranta |
| 2006/0192775 A1 | 8/2006 | Nicholson et al. |
| 2006/0250360 A1* | 11/2006 | Goodwin ............ G06F 3/03543 345/163 |
| 2007/0042807 A1* | 2/2007 | Khoo .................... G06F 3/0238 455/557 |
| 2007/0130371 A1* | 6/2007 | Chung .................. G06F 3/0231 710/1 |
| 2008/0024433 A1* | 1/2008 | Gunther ................. G06F 3/012 345/156 |
| 2010/0054519 A1* | 3/2010 | Mulvey ................ G06F 1/1632 381/386 |
| 2010/0205667 A1* | 8/2010 | Anderson ............... G06F 3/013 726/19 |
| 2010/0238041 A1 | 9/2010 | Acedo et al. |
| 2010/0332702 A1* | 12/2010 | Wu ......................... G06F 3/023 710/73 |
| 2010/0333170 A1* | 12/2010 | Cox .................... G06F 3/03543 726/1 |
| 2011/0256831 A1 | 10/2011 | Hsieh |
| 2011/0304543 A1* | 12/2011 | Chen ...................... G06F 3/038 345/163 |
| 2012/0062442 A1 | 3/2012 | Locker et al. |
| 2012/0194435 A1* | 8/2012 | Tsai ...................... G06F 3/0383 345/163 |
| 2013/0285911 A1* | 10/2013 | Nissen .................. G06F 1/3206 345/163 |
| 2014/0125575 A1 | 5/2014 | Samanta |

FOREIGN PATENT DOCUMENTS

| | | |
|---|---|---|
| EP | 2261772 A1 | 12/2010 |
| WO | WO-2011022014 A1 | 2/2011 |

* cited by examiner

ENABLING AN INPUT DEVICE SIMULTANEOUSLY WITH MULTIPLE ELECTRONIC DEVICES

TECHNICAL FIELD

The present disclosure relates generally to electronic devices. More specifically, the present disclosure relates to electronic input devices.

BACKGROUND

In the last several decades, the use of electronics has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronics. More specifically, electronic devices that perform new functions or that perform functions faster, more efficiently or with higher quality are often sought after.

Some electronic devices may connect with other electronic devices, such as input devices. For instance, some electronic devices use input devices to capture user data. Some examples of input devices include a keyboard, mouse, microphone, remote control device, button, joystick, trackball, touchpad, lightpen, etc. Improvement of how input devices connect with multiple electronic devices may be beneficial.

SUMMARY

A method for using an input device simultaneously with multiple electronic devices is described. A first connection is established with a first electronic device. The first connection enters an active mode. A second connection is established with a second electronic device. The second connection enters the active mode. The first connection switches to a standby mode in response to the second connection entering the active mode. The first connection and the second connection switch between the active mode and the standby mode, where only one connection is in the active mode at a time.

The input device may send input data to the electronic device that is connected in the active mode. Connection mode information corresponding to the first connection and connection mode information corresponding to the second connection may be stored when the input device is powered down. The connection mode of the first connection may be restored using the connection mode information corresponding to the first connection. The connection mode of the second connection may be restored using the connection mode information corresponding to the second connection.

The input device may be a Bluetooth input device. Switching the first connection and the second connection between the active mode and the standby mode may be triggered by selecting a single input on the input device.

A third connection may be established with a third electronic device. The third connection may enter the active mode. The first connection and the second connection may switch to a standby mode in response to the third connection entering the active mode. The first connection, the second connection, and the third connection may switch between the active mode and the standby mode, where only one connection may be in the active mode at a time. Switching the first connection, the second connection and the third connection between the active mode and the standby mode may be triggered by selecting a single input on the input device. Repeatedly selecting the single input may cycle the input device through the first connection, the second connection, and the third connection.

A maximum number of connections may be established. An oldest connection may be terminated when an additional connection is added or the connection that has not been in the active mode for the longest amount of time may be terminated when an additional connection is added.

A first connection status flag may correspond to the first connection and a second connection status flag may correspond to the second connection. Each connection status flag may indicate if the corresponding connection is in the active mode or the standby mode. Upon switching the first connection and the second connection between the active mode and the standby mode, each connection status flag may be updated.

Input data obtained on the input device may buffer while the first connection and the second connection switch between the active mode and the standby mode. The buffered input data may be transmitted after the switch is completed.

A transition from a power down state to a discoverable state may occur when no connection mode information is stored on the input device. A transition from the power down state to a paging state may occur when connection mode information is stored on the input device. A transition from a discoverable state to a paging state may occur when the input device successfully pairs with the electronic device that is trying to enter into the active mode with the human interface device (HID) input device. A transition from a discoverable state to an idle state may occur when a discoverable state timer expires. A transition from a discoverable state to the idle state may occur when a pairing failure occurs with the electronic device that is trying to enter into the active mode with the HID input device.

A transition from a paging state to an idle state may occur when a paging failure or a paging mode timeout occurs with the electronic device that is trying to enter into the active mode with the HID input device.

A transition to the active state may occur when input data is detected. A transition from the active state to a discoverable state may occur when an input on the input device is selected. The first electronic device may be in the active mode and the first electronic device may transition from an idle state to a power down state when the first electronic device is powered down. The second connection may automatically switch from the standby mode to the active mode when the first electronic device is powered down.

The first connection with the first electronic device may be maintained in the standby mode. The input device may not send input data to the first electronic device. The second connection with the second electronic device may be maintained in the active mode. The input device may send input data to the second electronic device.

An input device configured to simultaneously communicate with multiple electronic devices is also described. The input device includes a processor and executable instructions stored in memory that are in electronic communication with the processor. The input device establishes a first connection with a first electronic device. The first connection enters an active mode. The input device also establishes a second connection with a second electronic device. The second connection enters the active mode. The input device switches the first connection to a standby mode in response to the second connection entering the active mode. The input device switches the first connection and the second connection between the active mode and the standby mode, where only one connection is in the active mode at a time.

A computer-program product for using an input device simultaneously with multiple electronic devices is described. The computer-program product includes a non-transitory computer-readable medium having instructions thereon. The computer-program product includes instructions for causing an input device to establish a first connection with a first electronic device. The first connection enters an active mode. The computer-program product also includes instructions for causing the input device to establish a second connection with a second electronic device. The second connection enters the active mode. The computer-program product further includes instructions for causing the input device to switch the first connection to a standby mode in response to the second connection entering the active mode. The computer-program product additionally includes instructions for causing the input device to switch the first connection and the second connection between the active mode and the standby mode, where only one connection is in the active mode at a time.

An apparatus for using an input device simultaneously with multiple electronic devices is also described. The apparatus includes means for establishing a first connection with a first electronic device. The first connection enters an active mode. The apparatus also includes means for establishing a second connection with a second electronic device. The second connection enters the active mode. The apparatus further includes means for switching the first connection to a standby mode in response to the second connection entering the active mode. The apparatus additionally includes means for switching the first connection and the second connection between the active mode and the standby mode, where only one connection is in the active mode at a time.

DETAILED DESCRIPTION

In some known configurations, an input device may only be able to connect/pair with one electronic device at a time. For example, an input device may be connected to a first electronic device, allowing the input device to send input data to the first electronic device. When the input device connects to a second electronic device to provide input data to the second electronic device, the connection between the input device and the first electronic device may be terminated.

As an example, suppose a work station has multiple electronic devices, such as a laptop computer and a desktop computer. The workstation may also include an input device, such as a wireless keyboard or a wireless mouse. The keyboard or mouse may only be able to pair to either the laptop computer or the desktop computer at one time, for example, using Bluetooth technology. In other words, the keyboard or mouse cannot connect with both the laptop computer and the desktop computer at the same time. As a result, a user desiring to use both the laptop computer and the desktop computer at the same time must employ a separate keyboard and a separate mouse for each.

If the user desires to use the same keyboard and mouse for both electronic devices, the user would need to re-pair and reconnect the keyboard and mouse to the desired electronic device. Further, each time the keyboard and/or mouse connects with the desired electronic device, the connection with the previously connected electronic device would be lost. This process may become cumbersome for a user who needs to repeatedly switch the input device to different electronic devices.

Figure 1:
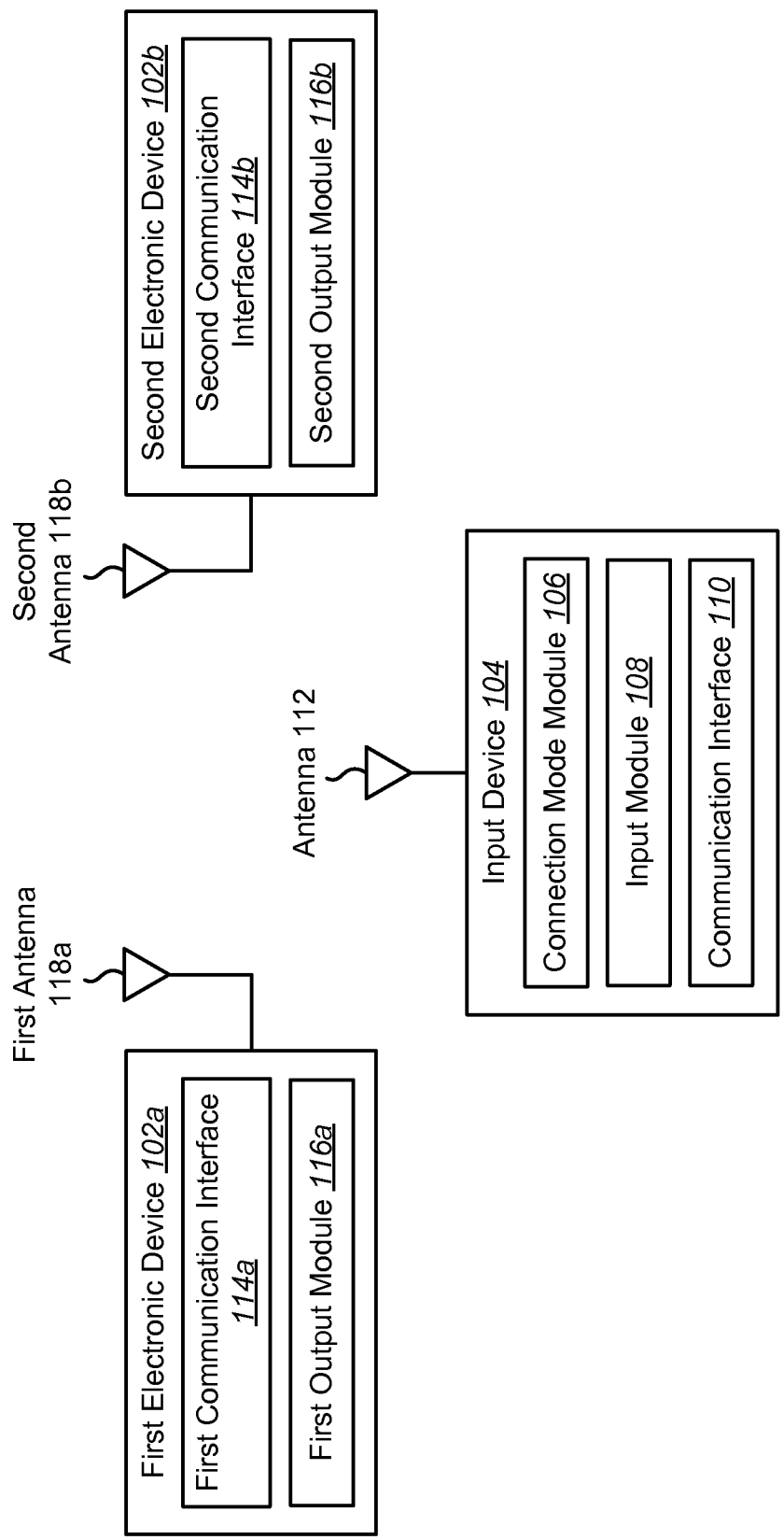
FIG. 1 is a block diagram illustrating one configuration of an input device that is enabled to simultaneously connect with multiple electronic devices.

FIG. 1 is a block diagram illustrating one configuration of an input device 104 that is enabled to simultaneously connect with multiple electronic devices 102*a-b*. The input device 104 may be a keyboard, mouse, microphone, remote control device, button, joystick, trackball, touchpad, lightpen, etc., or another type of human interface device (HID). The input device 104 may enable simultaneous connections with the multiple electronic devices 102*a-b*. The first electronic device 102*a* and/or the second electronic device 102*b* may be, for example, a laptop computer, a desktop computer, a notebook computer, a cellular phone, a smart phone, a wireless modem, an e-reader, a tablet device, a gaming system, etc.

As illustrated in FIG. 1, the input device 104 may enable simultaneous connections with the multiple electronic devices 102*a-b*. For example, the input device 104 may simultaneously maintain connections with the first electronic device 102*a* and the second electronic device 102*b*.

The first electronic device 102*a* may include a first communication interface 114*a*, a first output module 116*a* and a first antenna 118*a*. The first communication interface 114*a* may receive input data from the input device 104. For example, input data may be received via the first antenna 118*a* and the first communication interface 114*a*.

The first communication interface 114*a* may provide input data to the first output module 116*a*. The first output module 116*a* may output the input data, for example, on a display device. Examples of display devices in the first output module 116*a* may include a liquid crystal display (LCD), light-emitting diode (LED), gas plasma, electroluminescence, or the like. Other output devices may also be employed by the first output module 116*a*.

The second electronic device 102*b* may include a second communication interface 114*b*, a second output module 116*b* and a second antenna 118*b*. The second communication interface 114*b* may receive input data from the input device 104. For example, input data may be received via the second antenna 118*b* and the second communication interface 114*b*.

The second communication interface 114*b* may provide input data to the second output module 116*b*. The second output module 116*b* may output the input data, for example on a display device or output device.

The input device 104 may include a connection mode module 106, an input module 108, a communication interface 110 and an antenna 112. The input device 104 may be connected to multiple electronic devices 102a-b at the same time. However, the input device 104 may only send input data to one of the multiple electronic devices 102a-b at a time. In other words, only one of the connections may be active at a time.

The connection mode module 106 may monitor and maintain information about each connection between the input device 104 and the multiple electronic devices 102a-b.

In some configurations, the connection mode module 106 may set a connection status flag that corresponds to each connection with each electronic device 102. The connection status flag may indicate if the connection is in an active mode (e.g., actively connected) or in a standby mode (e.g., connected but in a standby state). When one of the connections becomes the active connection, the connection mode module 106 may set the connection status flags on the remaining connections to standby. Thus, the connection mode module 106 may maintain which electronic device 102 the input device is actively connected to and which electronic devices 102 the input device is connected with but not receiving input data.

The electronic device 102 that receives input data may be flagged as active or in the active mode. The other multiple electronic devices 102 that are connected to the input device 104, but that are receiving input data sent from the input device 104 may be flagged as standby, or in the standby mode.

When the input device 104 receives a notification that the active connection should switch from one electronic device 102, such as the first electronic device 102a, to a second electronic device 102, such as the second electronic device 102b, the connection mode module 106 may change the status of each connection status flag to correspond to the selected change. In this manner, the input device 104 may switch from sending input data from the first electronic device 102a to the second electronic device 102b. Additionally, the connection mode module 106 may change the connection status flag of the first connection to standby mode and the connection status flag of the second connection to active mode.

The connection mode module 106 may also assist the input device 104 in establishing a connection and/or pairing with an electronic device 102. For example, the input device 104 may be paired with the first electronic device 102a only. Before the input device 104 can switch to communicate with the second electronic device 102b, the input device may need to pair with the second electronic device 102b. The connections mode module 106 may facilitate pairing with the second electronic device 102b. Once the input device 104 is paired to the second electronic device 102b, the connection mode module 106 may switch communications between the first electronic device 102a and the second electronic device 102b.

The input module 108 may obtain input, such as user input, indicating to the input device 104 to switch communications between electronic devices 102 or to pair with a new electronic device 102. For example, the input module 108 may be coupled to a button or key on the input device 104 that detects user input. For instance, the input device 104 may be a Bluetooth mouse that has a button that when selected or pressed, indicates to the input device 104 to switch communications to another electronic device 102.

In some configurations, the switch button may be briefly pressed to indicate to the input device 104 to switch the input device 104 from the first electronic device 102a to the second electronic device 102b. Additionally, the switch button may be held down for a longer period of time to indicate to the input device 104 to pair with another electronic device 102.

The communication interface 110 may allow the input device 104 to send and receive data from the multiple electronic devices 102a-b. For example, the communication interface 110 may send user input data via the antenna 112. In some configurations, the communication interface 110 may provide the input device 104 the ability to communicate using different technology interfaces. For example, the communication interface 110 may allow the input device 104 to communicate using Bluetooth, Wi-Fi, infrared, near-wave communications, etc.

In some configurations, the input device 104 may be able to retain the connection mode (e.g., active mode or standby mode) of the connection between the input device 104 and both the first electronic device 102a and the second electronic device 102b when switching between modes. When the input device 104 connects to the second electronic device 102b, the input device 104 may switch the connection status flag of the connection between the input device 104 and the first electronic device 102a (e.g., the first connection). For example, the input device 104 may switch and update the first connection status flag to standby, or standby mode.

Upon connecting with the second electronic device 102b and updating the first connection status flag, the input device 104 may actively communicate with the second electronic device 102b. Accordingly, the input device 104 may update the second connection status flag to active, or active mode. In some configurations, when the input device 104 establishes a new connection corresponding to a newly connected electronic device 102, the connection status flag for the new connection may be switched to active while the connection status flag corresponding to previous connections may be updated to standby.

When the input device 104 is to be switched back to sending input data to the first electronic device 102a, the connection status flag corresponding to the connection with the second electronic device 102b (e.g., the second connection) may be updated to standby mode and the first connection status flag may be switched to active mode. If the first connection status flag indicates that the first connection is the active connection, then input data will be sent to the first electronic device 102a. In this manner, the input device 104 may be simultaneously connected to both the first electronic device 102a and the second electronic device 102b while maintaining the requirement of actively communicating with only one electronic device 102 at a time. Furthermore, the input device 104 may quickly and dynamically change between transmitting input data between the first electronic device 102a and the second electronic device 102b.

In some configurations, the input device 104 may switch between the first electronic device 102a and the second electronic device 102b when an input is selected. For example, a user may press a button or a key on a keyboard to switch the input of the keyboard from a laptop computer to a desktop computer. In this manner, the input device 104 may be able to maintain connections to multiple electronic devices 102 simultaneously while also being able to send input data to the desired electronic device 102.

As an example, in the case of the input device 104 being a Bluetooth input device such as a Bluetooth mouse, the Bluetooth mouse may pair with multiple electronic devices 102. The Bluetooth mouse may actively communicate with one electronic device 102, while maintaining connections (e.g., standby connections) with the other electronic devices 102. In other words, the Bluetooth mouse may actively communicate (e.g., send input data) with one electronic device 102, while still being connected with multiple other electronic devices 102 in a standby mode until a switch is requested by a user.

Continuing the example of the Bluetooth mouse, when a request to change electronic devices 102 is made, the Bluetooth mouse may switch which electronic device 102 it communicates with. However, the Bluetooth mouse does not need to re-pair with the desired electronic device 102. Rather, the Bluetooth mouse switches which electronic device 102 to send input data to. The Bluetooth mouse may choose to send input data to a previously connected electronic device 102 or may choose to connect with a new electronic device 102 and send input data to the newly connected electronic device 102.

If a user requests to change which electronic device 102 to send input data to, the user selects the desired electronic device 102, for example, by using a button that requests the switch. Once the user selects the desired electronic device 102 to send input data to, the input device 104 may update the connection status flag corresponding to the connection with the desired electronic device 102 to active. The input device 104 also updates the connection status flag corresponding to each connection with the other electronic device 102 to standby. Accordingly, a user may use the Bluetooth mouse to quickly switch between multiple electronic devices 102 while using a single Bluetooth mouse as the input device 104.

Figure 2:
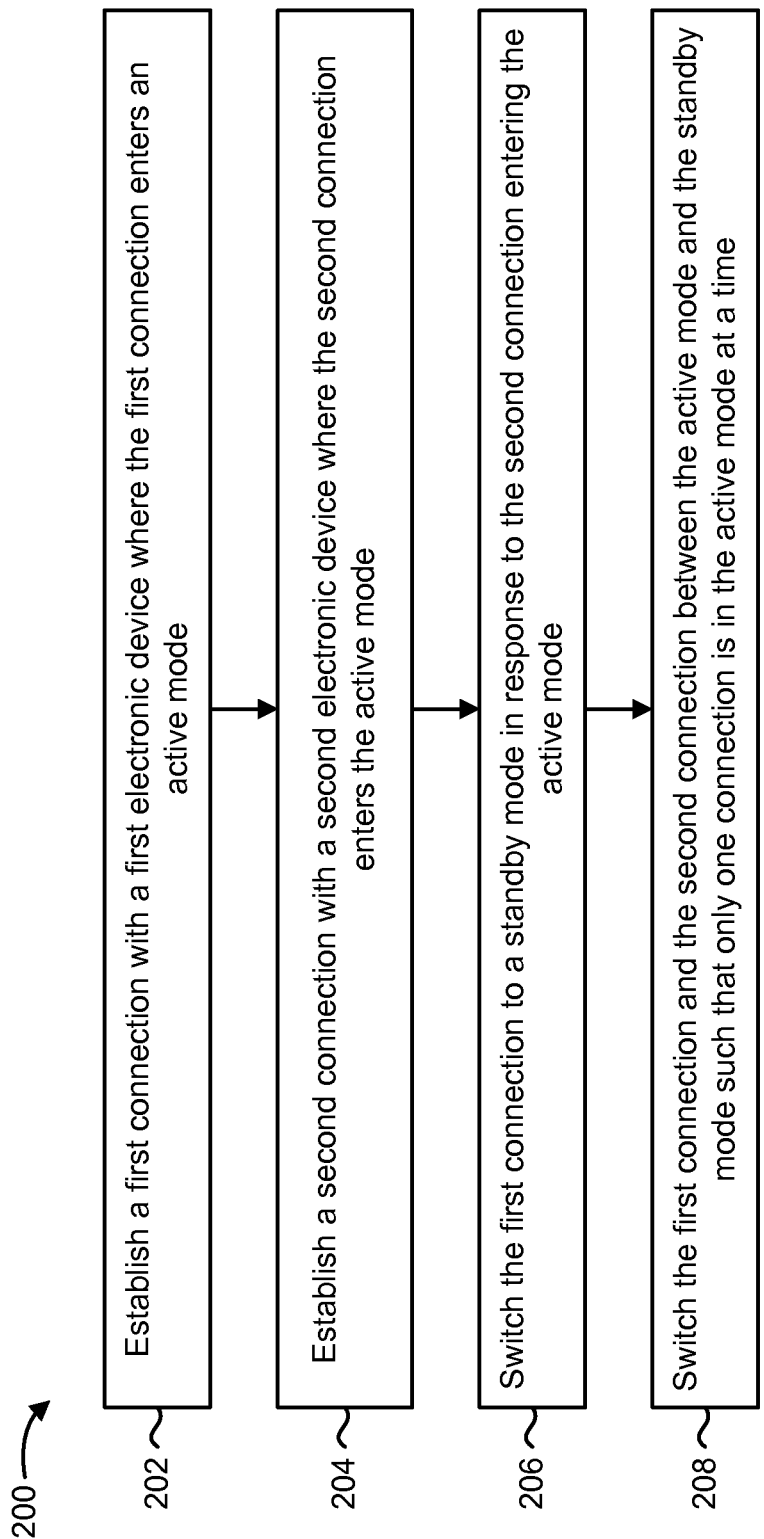
FIG. 2 is a flow diagram illustrating one configuration of a method for using an input device simultaneously with multiple electronic devices.

FIG. 2 is a flow diagram illustrating one configuration of a method 200 for using an input device 104 simultaneously with multiple electronic devices 102a-b. The method 200 may be performed by an input device 104, such as the input device 104 described in connection with FIG. 1. In addition, input device 104 may be a Bluetooth input device, such as a Bluetooth mouse or a Bluetooth keyboard.

The input device 104 may establish 202 a first connection with a first electronic device 102a. The first connection may enter an active mode. In other words, a first connection status flag corresponding to the first connection may be flagged as active. Once actively connected, the input device 104 may send input data to the first electronic device 102a via the first connection.

The input device 104 may establish 204 a second connection with a second electronic device 102b. The second connection may enter the active mode. In other words, a second connection status flag corresponding to the second connection may be flagged as active upon the second electronic device 102b connecting with the input device.

The input device 104 may switch 206 the first connection to a standby mode in response to the second connection entering the active mode. Thus, when the second connection status flag is updated to active, the first connection status flag may update to standby mode. This may occur because the input device 104 may only be able to actively communicate with one electronic device 102 at a time. Thus, when the second connection enters the active mode, the first connection may be switched to a standby mode. In a similar fashion, when the second connection status flag is updated to active mode, all other connection status flags corresponding to other connections between the input device 104 and the other electronic devices 102 may be switched to standby mode.

When the input device 104 is actively connected to the second electronic device 102b, the input device 104 may actively communicate and send input data to the second electronic device 102b via the second connection.

In some configurations, when an additional connection is made, the oldest existing connection may be terminated and the corresponding connection status flag may be deleted. For example, if the input device 104 is connected to a maximum number of connections, then the process of adding another connection may require terminating an older connection to allow room for the new connection to be made. For instance, if the input device 104 can only maintain three connections simultaneously, one in an active mode and two in a standby mode, adding a fourth connection corresponding to a fourth electronic device (not shown) would require the input device 104 to remove one of the existing connections.

The input device 104 may remove the oldest existing connection. In one configuration, the oldest existing connection may be the connection that was established before any of the other existing connections. In another configuration, the oldest connection may be the connection that has been in standby mode the longest. In other words, the oldest connection is the connection that has been not used in the longest amount of time. It should be appreciated that other methods and approaches may be employed in selecting the connection to remove. For example, the user may be prompted as to which connection to remove.

The maximum number of connections allowed with the input device 104 may be configurable. In other words, a user may specify the number of devices to maintain before connections to older devices are removed or terminated. In this manner, a user may specify the number of devices that would need to be cycled through before the list of maintained connections would start repeating.

The input device 104 may switch 208 the first connection and the second connection between the active mode and the standby mode such that only one connection is in the active mode at a time. When the first connection is switched to the active mode, the second connection may be placed in the standby mode or may be disconnected. The input device 104 may again send user input data to the first electronic device 102a as if the first connection had always been actively connected. In other words, when the input device 104 puts the first connection in the standby mode, the first electronic device 102a may not know that the input device 104 is not sending input data to it. Rather, the first electronic device 102a may determine that no input data is being obtained by the input device 104. In this case, the first electronic device 102a may still believe that it is the only electronic device 102 paired with the input device 104. When the input device 104 switches the first connection back to the active mode, the first electronic device 102a may again receive input data from input device 104.

When the input device 104 switches between the first electronic device 102a and the second electronic device 102b, or between any two electronic devices 102, the input device 104 may buffer user input data until the switch is complete. For example, a user may switch a keyboard from sending input data from a laptop computer to a desktop computer by pushing a switching input button on the keyboard. After pushing the switching input button, and before the switch is completed, the user may begin to enter input data. The keyboard may buffer the user input until the connection between the keyboard and the desktop computer is reactivated. Once the connection is reactivated, the keyboard may send the buffered input data to the desktop computer.

Figure 3:
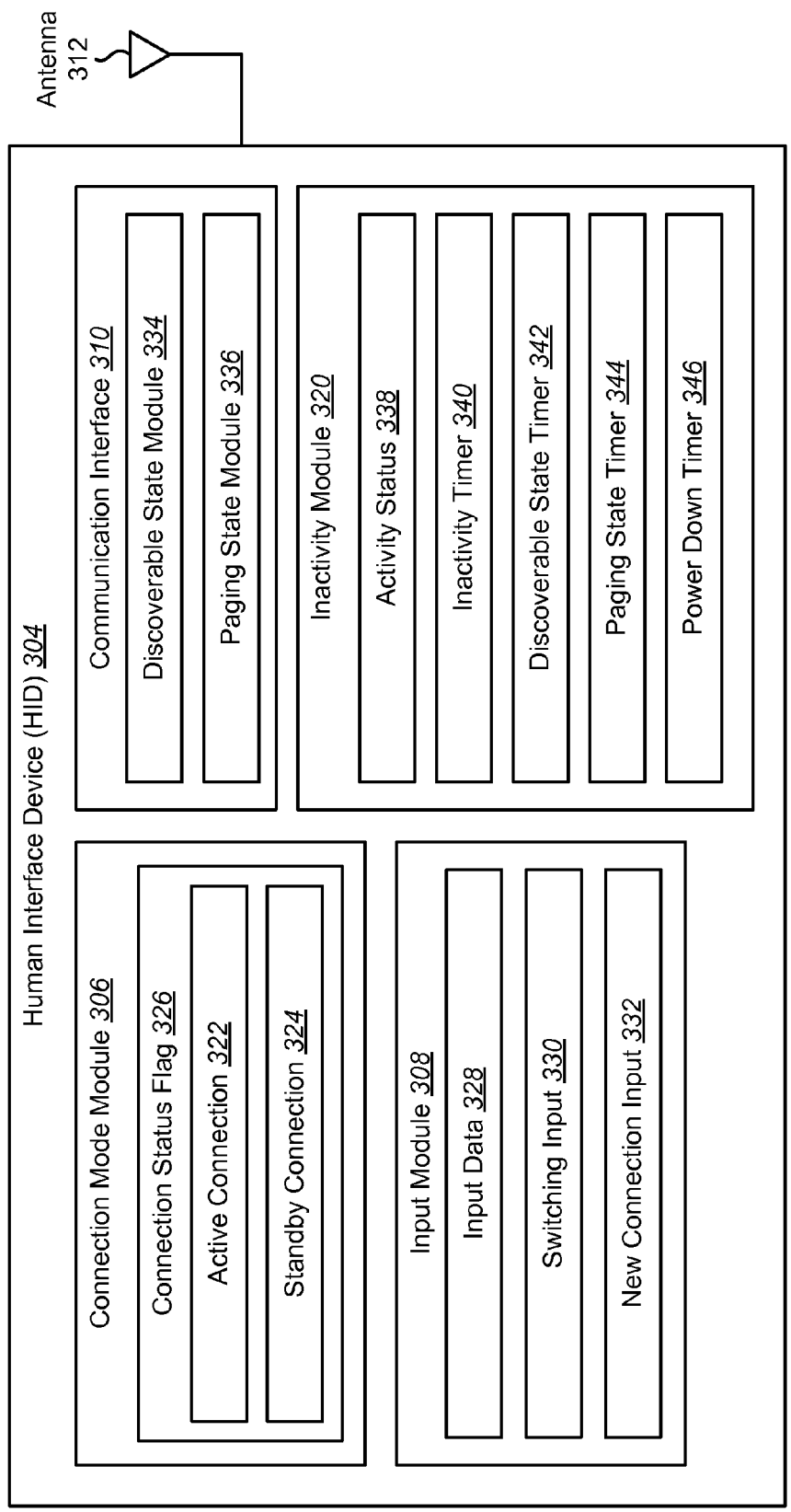
FIG. 3 is a block diagram illustrating one configuration of a human interface device.

FIG. 3 is a block diagram illustrating one configuration of a human interface device (HID) 304. The HID 304 may be one example of the input device 104 described in connection with FIG. 1. For example, the HID 304 may establish a first connection with a first electronic device 102a, a second connection with a second electronic device 102b and additional connections with other electronic devices (not shown).

The HID 304 may include a connection mode module 306, an input module 308, a communication interface 310, an inactivity module 320 and an antenna 312. The connection mode module 306 may assist the HID device 304 in establishing a connection and/or pairing with an electronic device 102. The connection mode module 306 may include a connection status flag 326 that indicates an active connection 322 or a standby connection 324.

The connection mode module 306 may monitor and maintain connection information corresponding to each of the multiple electronic devices 102. For example, the connection mode module 306 may track which electronic device 102 is actively connected to the HID 304 and which electronic devices 102 are connected to the HID 304 in a standby mode.

The connection status flag 326 that is marked as the active connection 322 may indicate which electronic device 102 the HID 304 is actively connected to. Connection status flags 326 that are marked as the standby connection 324 may indicate which electronic devices 102 are connected to the HID 304 in the standby mode. For example, if the HID 304 is actively connected to the first electronic device 102a and subsequently, the HID 304 actively connects to the second electronic device 102b, the connection status flag 326 corresponding to the connection between the HID 304 and the first electronic device 102a may be updated to indicate a standby connection 324.

If a switch between electronic devices 102 is requested, the connection status flag 326 corresponding to the connection of the electronic device 102 that was actively connected may be switched from indicating an active connection 322 to indicating a standby connection 324. This may result when a connection status flag 326 corresponding to a connection that was previously marked as a standby connection 324 is switched to indicate that it is now the active connection 322.

In some configurations, when a new electronic device 102 is connected, the connection status flag 326 corresponding to the connection of the new electronic device 102 may be marked as the active connection 322. All previous connections may enter into the standby mode, if not already in the standby mode. In other words, the previously actively connected electronic device 102 that did have a connection status flag 326 indicating the active connection 322 will be updated to indicate that the previously actively connected electronic device 102 now has a standby connection 324. Also, all other electronic devices 102 that had connection status flags 326 indicating a standby connection 324 will remain in the standby mode and their corresponding connection status flags 326 will indicate a standby connection 324. If the maximum number of maintained connections has been reached, then one of the previous connections, such as the oldest existing connection, may be terminated to allow the new electronic device 102 to be connected.

The input module 308 may include input data 328, a switching input 330 and a new connection input 332. The input module 308 may obtain input, such as user input data 328. For example, if the HID 304 is a keyboard, the input data 328 may include key strokes from a user. If the HID 304 is a mouse, the input data 328 may include user mouse movements.

The switching input 330 may be a key or a button on the HID 304 to indicate to the HID 304 to switch communications between electronic devices 102. For example, if the switching input 330 is selected, the HID 304 may switch one of the standby connections 324 to the active connection 322 and may switch the previously actively connected electronic device 102 to a standby connection 324.

The new connection input 332 may indicate to the HID 304 to establish a new connection between a new electronic device 102 and the HID 304. In some configurations, the switching input 330 and the new connection input 332 may be the same key or button, for instance, on the HID 304. For example, a user may short-press a button on the HID 304 to switch connections and long-press the same button to add a new electronic device 102.

As another example, the switching input 330 and the new connection input 332 may be triggered by the same button. When a user has cycled through all the connections, the HID 304 may attempt to connect with an additional electronic device 102. Adding an additional electronic device 102 may be canceled or skipped by again pushing the button to again cycle through the active connection 322 and the standby connections 324.

The communication interface 310 may include a discoverable state module 334 and a paging state module 336. The communication interface 310 may allow the HID 304 to send and receive data from the multiple electronic devices 102. For example, the communication interface 310 may send user input data via the antenna 312.

In some configurations, the communication interface 310 may provide the HID 304 the ability to communicate using different technology interfaces. For example, the communication interface 310 may allow the HID 304 to communicate using Bluetooth, Wi-Fi, infrared, near-wave communications, etc. For example, if the HID 304 is a Bluetooth device, the discoverable state module 334 and the paging state module 336 may assist the HID 304 in pairing with another Bluetooth-enabled electronic device 102. Similarly, if the HID 304 is a Wi-Fi device, the discoverable state module 334 may assist the HID 304 in connecting with another Wi-Fi-enabled electronic device 102.

The inactivity module 320 may monitor the current activity status between the HID 304 and the electronic device 102 to which the HID 304 is actively connected (e.g., the active connection 322). The inactivity module 320 may include an activity status 338, an inactivity timer 340, a discoverable state timer 342, a paging state timer 344 and a power down timer 346.

The activity status 338 may indicate the connection status between the HID 304 and the electronic device 102 to which the HID 304 is actively connected. Even when the HID 304 is actively connected to an electronic device 102, the HID 304 may enter into idle mode. For example, if the HID 304 is a Bluetooth mouse and a user has not moved the mouse for a specified amount of time (e.g., the inactivity timer 340 has expired), the Bluetooth mouse may enter into idle mode to conserve power. Then, when a user moves the Bluetooth mouse, the HID 304 changes back to the active mode to again actively communicate with the electronic device 102. Additional information regarding active mode, idle mode and timeouts will be given in connection with FIG. 7 below.

The HID 304 may also use other timers. For example, when the HID 304 employs the discoverable state module 334 to connect with a new electronic device 102, the discoverable state timer 342 may start. If the discoverable state timer 342 expires or times out before the HID 304 connects to a new electronic device 102, the HID 304 may switch to a previously connected electronic device 102. Similarly, if the paging state timer expires or times out when the HID 304 enters into a paging state, the HID 304 may switch to a previously connected electronic device 102 or stop attempting to page the electronic device 102 to which the HID 304 is actively connected.

In some configurations, if the HID 304 is in idle mode for a period of time, such as the duration of the power down timer 346, then the HID 304 may power down to conserve power. This may occur when the power down timer 346 expires once in idle mode. The HID 304 may maintain the connection status of each connection (e.g., the connection status flag 326) to which the HID 304 is connected so that connections with each of the electronic devices 102 may be reestablished once the HID 304 is powered back on.

Figure 4:
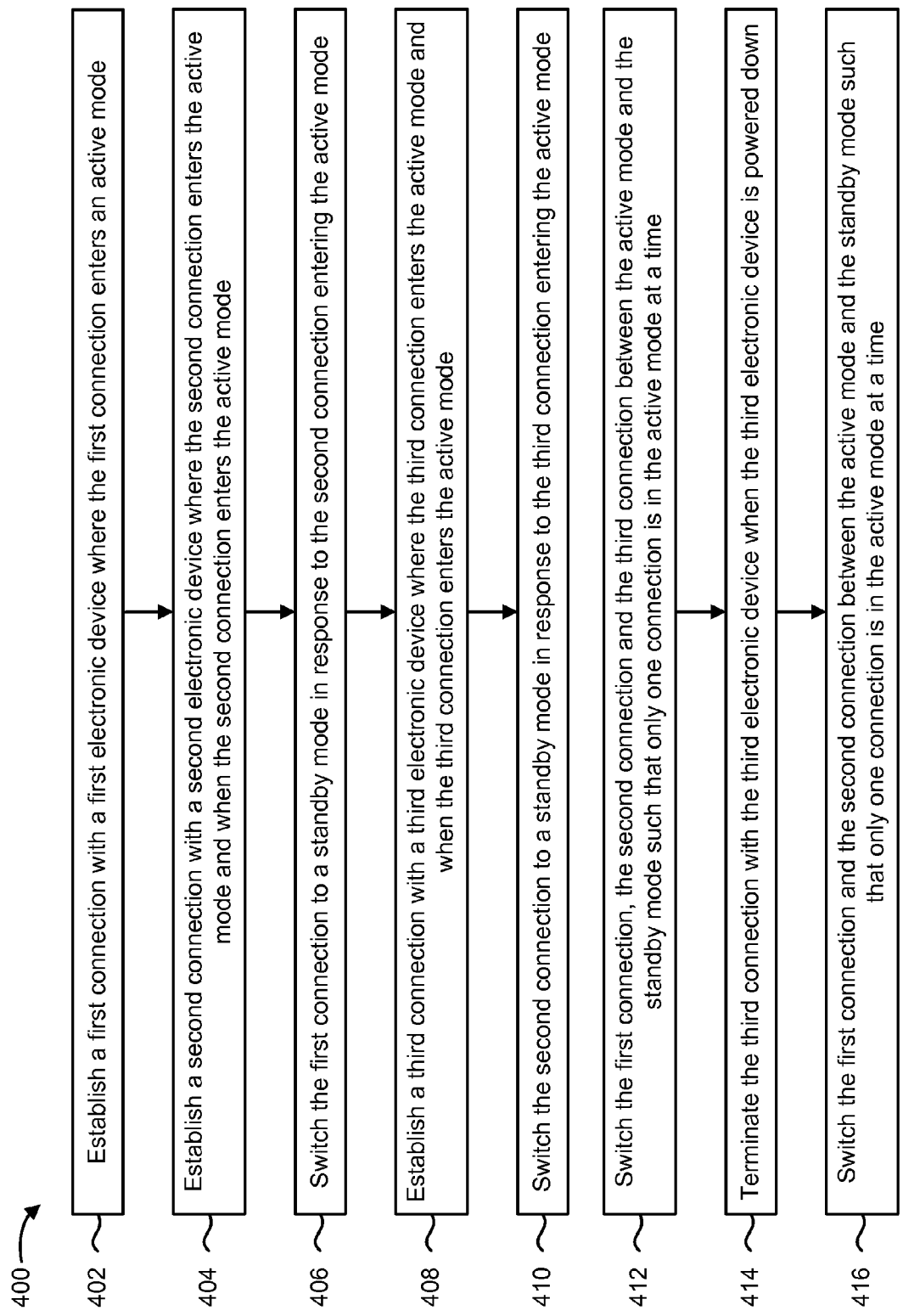
FIG. 4 is a flow diagram illustrating a more detailed configuration of a method for using an input device simultaneously with multiple electronic devices.

FIG. 4 is a flow diagram illustrating a more detailed configuration of a method 400 for using an input device 104 simultaneously with multiple electronic devices 102. The method 400 may be performed by an input device 104, such as the input device 104 described in connection with FIG. 1. Additionally, the method 400 may be performed by a human interface device (HID) 304, such as the HID 304 described in connection with FIG. 3. The input device 104 may be a Bluetooth input device, such as a Bluetooth mouse or a Bluetooth keyboard.

The input device 104 may establish 402 a first connection with a first electronic device 102a. The first connection may enter an active mode. In other words, a first connection status flag 326 corresponding to the first connection may be flagged as active (e.g., flagged as the active connection 322). Once actively connected, the input device 104 may send input data 328 to the first electronic device 102a via the first connection.

The input device 104 may establish 404 a second connection with a second electronic device 102b. The second connection may enter the active mode. In other words, a second connection status flag 326 corresponding to the second connection may be flagged as active (e.g., flagged as the active connection 322).

The input device 104 may switch 406 the first connection to a standby mode in response to the second connection entering the active mode. Thus, when the second connection status flag 326 is updated to active mode, the first connection status flag 326 may update to standby mode.

The input device 104 may establish 408 a third connection with a third electronic device (not shown). The third connection may enter the active mode. The input device 104 may switch 410 the second connection to a standby mode in response to the third connection entering the active mode. Thus, when the third connection enters into active mode, the second connection may join the first connection in standby mode. Accordingly, the input device 104 may actively communicate with the third electronic device while the first connection and the second connection have corresponding connection status flags 326 indicating that they are standby connections 324.

The input device 104 may switch 412 the first connection, the second connection and the third connection between the active mode and the standby mode. When the first connection is selected to again be the active connection 322, the second connection and the third connection may be switched to a standby mode and their corresponding connection status flags 326 may be updated to indicate a standby connection 324. Similarly, when the second connection is selected to be the active connection 322, the first connection and the third connection may switched to a standby mode and their corresponding flags may be updated to indicate a standby connection 324.

In some configurations, the input device 104 may terminate 414 the third connection with the third electronic device (not shown). For instance, the input device 104 may determine that the third electronic device is powered down. If the third electronic device is powered down, the input device 104 may terminate 414 the connection between the input device 104 and the third electronic device.

Once the third connection is terminated, the input device 104 may switch 416 the first connection and the second connection between the active mode and the standby mode such that only one connection is the active mode at a time. If the first connection is the active connection 322, the second connection is placed in the standby mode. Upon selecting the first connection to be the active connection 322, the input device 104 may send user input data 328 to the first electronic device 102a as if the first connection had always been actively connected.

Figure 5:
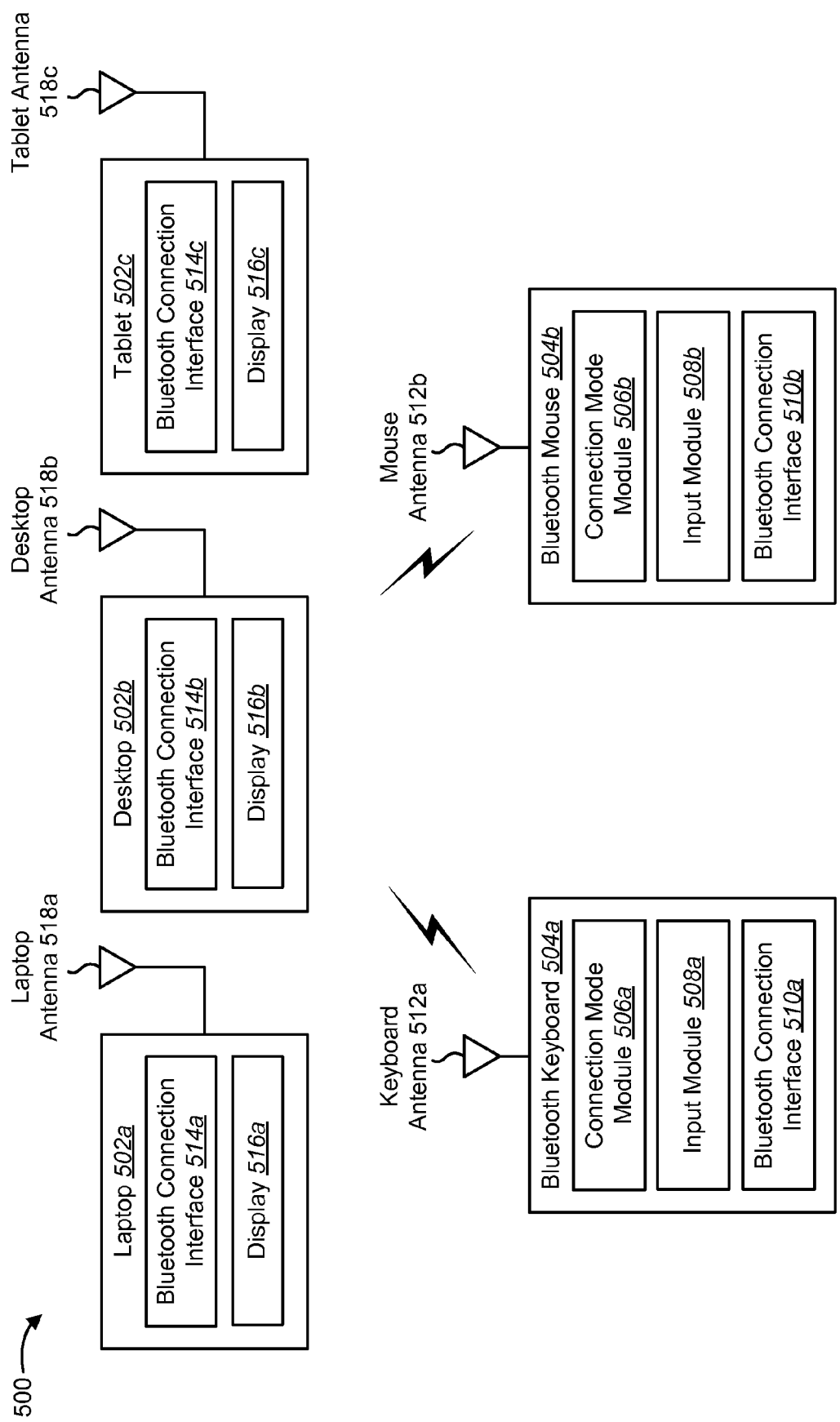
FIG. 5 is a diagram illustrating one configuration of a system in which one or more Bluetooth input devices may simultaneously connect with multiple electronic devices.

FIG. 5 is a diagram illustrating one configuration of a system in which one or more Bluetooth input devices may simultaneously connect with multiple electronic devices. FIG. 5 shows one example wireless communication system 500 in which a Bluetooth keyboard 504a and a Bluetooth mouse 504b may simultaneously connect with multiple electronic devices, such as a laptop 502a, a desktop 502b, a tablet 502c, etc.

The laptop 502a, the desktop 502b and the tablet 502c may each have a Bluetooth connection interface 514a-c, a display 516a-c and an antenna 518a-c, respectively. The Bluetooth connection interface 514 may allow the electronic devices 502 to pair and communicate with one or more of the input devices (e.g., the Bluetooth keyboard 504a and the Bluetooth mouse 504b).

The display 516 on the laptop 502a, the desktop 502b and the tablet 502c may display input data from the input devices. For example, the display 516 may be a liquid crystal display (LCD) or light-emitting diode (LED) monitor that displays mouse movements and keyboard strokes from the Bluetooth keyboard 504a and/or the Bluetooth mouse 504b.

The Bluetooth keyboard 504a and the Bluetooth mouse 504b may each include a connection mode module 506a-b, an input module 508a-b, a Bluetooth connection interface 510a-b and an antenna 512a-b, respectively. The connection mode module 506 may monitor and maintain connections between the multiple electronic devices 502a-c. The connection mode module 506 may also assist the Bluetooth keyboard 504a and the Bluetooth mouse 504b in establishing and/or pairing connections with the laptop 502a, the desktop 502b and/or the tablet 502c.

The input module 508 may obtain input, such as user input data 328, indicating to the Bluetooth keyboard 504a and/or the Bluetooth mouse 504b to switch communications between the laptop 502a, the desktop 502b and/or the tablet 502c or to pair with a new electronic device (not shown). For example, a user may select an input button on the Bluetooth keyboard 504a and/or the Bluetooth mouse 504b to switch input from the Bluetooth keyboard 504a and/or the Bluetooth mouse 504b between the laptop 502a and the desktop 502b.

In some configurations, the Bluetooth keyboard 504a and the Bluetooth mouse 504b may be in communication with each other such that when a user selects a switching input button on the Bluetooth keyboard 504a (or Bluetooth mouse 504b), the input data from both the Bluetooth keyboard 504a and the Bluetooth mouse 504b is switched from one electronic device 502 to another.

The Bluetooth connection interface 510 may allow the Bluetooth keyboard 504a or Bluetooth mouse 504b to send data to and receive data from the multiple electronic devices 502a-c via the Bluetooth interface. For example, the Bluetooth communication interface 510 may allow the Bluetooth keyboard 504a and/or the Bluetooth mouse 504b to send user input data via the antennas 512a-b, respectively. The multiple electronic devices 502a-c may receive the input data 328 via their respective antennas 518a-c.

The Bluetooth keyboard 504a and the Bluetooth mouse 504b may pair with the laptop 502a, the desktop 502b and/or the tablet 502c. While the Bluetooth keyboard 504a and the Bluetooth mouse 504b may pair with the multiple electronic devices 502a-c simultaneously, the Bluetooth keyboard 504a and the Bluetooth mouse 504b may only actively communicate with one electronic device 502 at a time. If the Bluetooth keyboard 504a and the Bluetooth mouse 504b are actively communicating with and sending input data to the desktop 502b, then the connection modes of the laptop 502a and the tablet 502c are paused in a standby mode. If the switch selection input (e.g., switching input 330) is triggered, then the Bluetooth keyboard 504a and/or the Bluetooth mouse 504b may switch to be actively connected to the laptop 502a, the tablet 502c or another electronic device (not shown). In this manner, a user may cycle through different electronic devices 502a-c and select which electronic device 502 to actively communicate with via the Bluetooth keyboard 504a and the Bluetooth mouse 504b.

Figure 6:
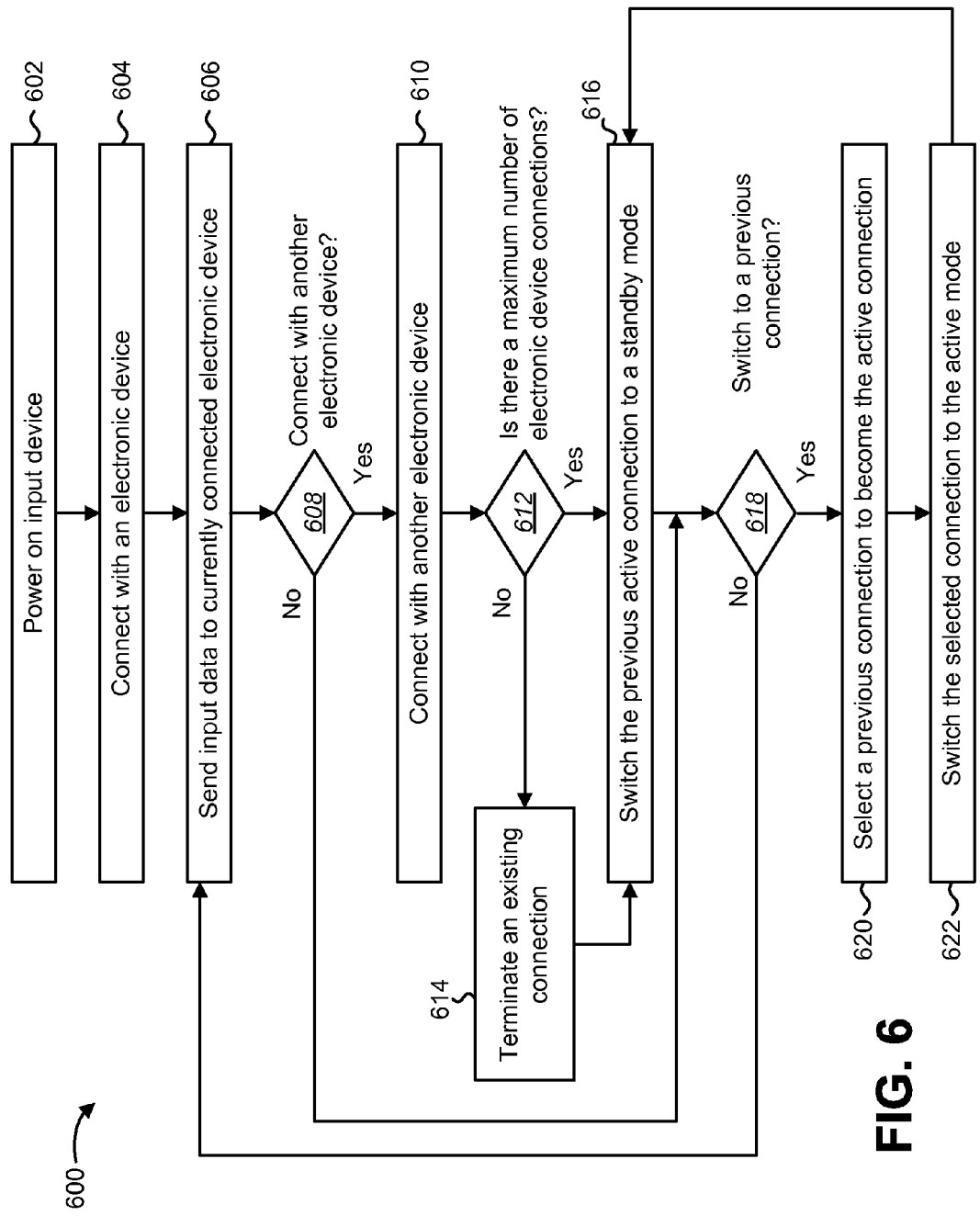
FIG. 6 is a flow diagram illustrating a more detailed configuration of a method for using an input device simultaneously with multiple electronic devices.

FIG. 6 is a flow diagram illustrating a more detailed configuration of a method 600 for using an input device simultaneously with multiple electronic devices 102. The method 600 may be performed by an input device 104, such as the input device described in connection with FIG. 1. Additionally, the method 600 may be performed by a human interface device (HID) 304, such as the HID 304 described in connection with FIG. 3. The input device 104 may be a Bluetooth input device, such as a Bluetooth mouse or a Bluetooth keyboard.

The input device 104 may power on 602. This may occur if the input device was previously in a powered-down mode. In some configurations, when the input device is powered on 602, the input device 104 may not be connected to any electronic devices 102. Further, the input device 104 may not have any information corresponding to any connections stored in memory. In other configurations, when the input device is powered on 602, the input device 104 may have information corresponding to previous connections stored in memory. For example, the input device 104 may have information corresponding to a connection with a first electronic device 102a stored in memory. Furthermore, the input device 104 may also have stored in memory that the connection status flag 326 corresponding to the first connection with the first electronic device 102a may indicate that the first connection is an active connection 322.

Once powered on 602, the input device 104 may connect 604 with an electronic device 102, such as the first electronic device 102a. For example, if the input device 104 is a Bluetooth input device, it may pair with a first electronic device 102a. The input device 104 may then actively communicate with the first electronic device 102a. The input device 104 may also update the first connection status flag 326 to indicate that the first connection is the active connection 322.

The input device 104 may send 606 input data 328 to the connected electronic device 102. In this case, the input device 104 may send input data 328 to the first electronic device 102a. Input data 328 may include mouse movements, key strokes, button selections, voice commands, user selections, etc.

The input device 104 may determine 608 whether to connect with another electronic device 102, such as a second electronic device 102b. If the input device 104 determines to connect with another electronic device 102, such as the second electronic device 102b, then the input device 104 may connect 610 with the other electronic device 102. For example, in the case of the input device 104 being a Bluetooth input device, the input device 104 may pair with the second electronic device 102b. By pairing with the second electronic device 102b, the input device 104 establishes an active connection 322 between the input device 104 and the second electronic device 102b. Upon establishing an active connection 322 with the second electronic device 102b, the input device 104 may update the first connection status flag 326 to indicate a standby connection 324.

The input device 104 may determine 612 whether there is a maximum number of electronic device connections. If there is a maximum number of connections, the input device 104 may terminate 614 an existing connection. For example, if the input device 104 has a maximum number of connections, then adding another connection may require an older connection to be terminated 614 to allow room for the new connection. In some configurations, the maximum number of electronic devices 102 that can pair may depend on a standard, such as the Bluetooth standard.

The input device 104 may terminate 614 an existing connection by removing the oldest existing connection. In one configuration, the oldest existing connection may be the connection that was established before any of the other existing connections. In another configuration, the oldest connection may be the connection that has been in standby mode the longest. In still another configuration, the input device 104 may terminate 614 the connection that has been used the least (e.g., the connection with the least amount of time as the active connection 322).

If there is not a maximum number of connections, then the input device 104 may switch 616 the previous active connection to a standby mode. For example, if the input device 104 is actively connected to the first electronic device 102a and subsequently becomes actively connected to the second electronic device 102b, then the first connection may be put in a standby mode and may be marked as a standby connection 324 (e.g., the connection status flag 326 corresponding to the second connection between the input device 104 and the second electronic device 102b may be marked as a standby connection 324).

After the previous active connection is switched 616 to the standby mode or if the input device 104 does not determine 608 to connect with another electronic device 102, then the input device 104 may determine 618 whether to switch to a previous connection. If the input device 104 does not switch to a previous connection, such as one of the connections marked as a standby connection 324, then the input device 104 may send 606 input data 328 to the currently connected electronic device 102 (e.g., the electronic device 102 marked as the active connection 322).

If the input device 104 does switch to a previous connection (e.g., one of the connections marked as a standby connections 324), then the input device 104 may select 620 a previous connection to become the active connection 322. For example, a user may desire to select 620 the first connection between the input device 104 and the first electronic device 102a. The user may indicate a selection change by employing a switching input 330, such as a key or a button on the input device 104. In this case, the input device 104 may switch 622 the selected connection to the active mode. The selected connection may then be marked as the active connection 322. The input device 104 may then switch 616 all other connections, including the connection that was previously active, to the standby mode and may update their corresponding connection status flags 326 to indicate that they are now standby connections 324.

The method 600 may continually cycle as additional electronic devices are added, active connections 322 are selected, and standby connections 324 are updated. For example, the input device 104 may establish a connection with a third electronic device (not shown).

As another example, a Bluetooth mouse 504b may cycle through and select 620 a previous connection to become the active connection 322 from among a laptop 502a, a desktop 502b and a tablet 502c, as described in connection with FIG. 5. In this manner, the input device 104 may quickly and dynamically switch from sending input data 328 between the multiple electronic devices 502 without re-establishing a new connection each time the input device 104 switches between electronic devices 502.

Figure 7:
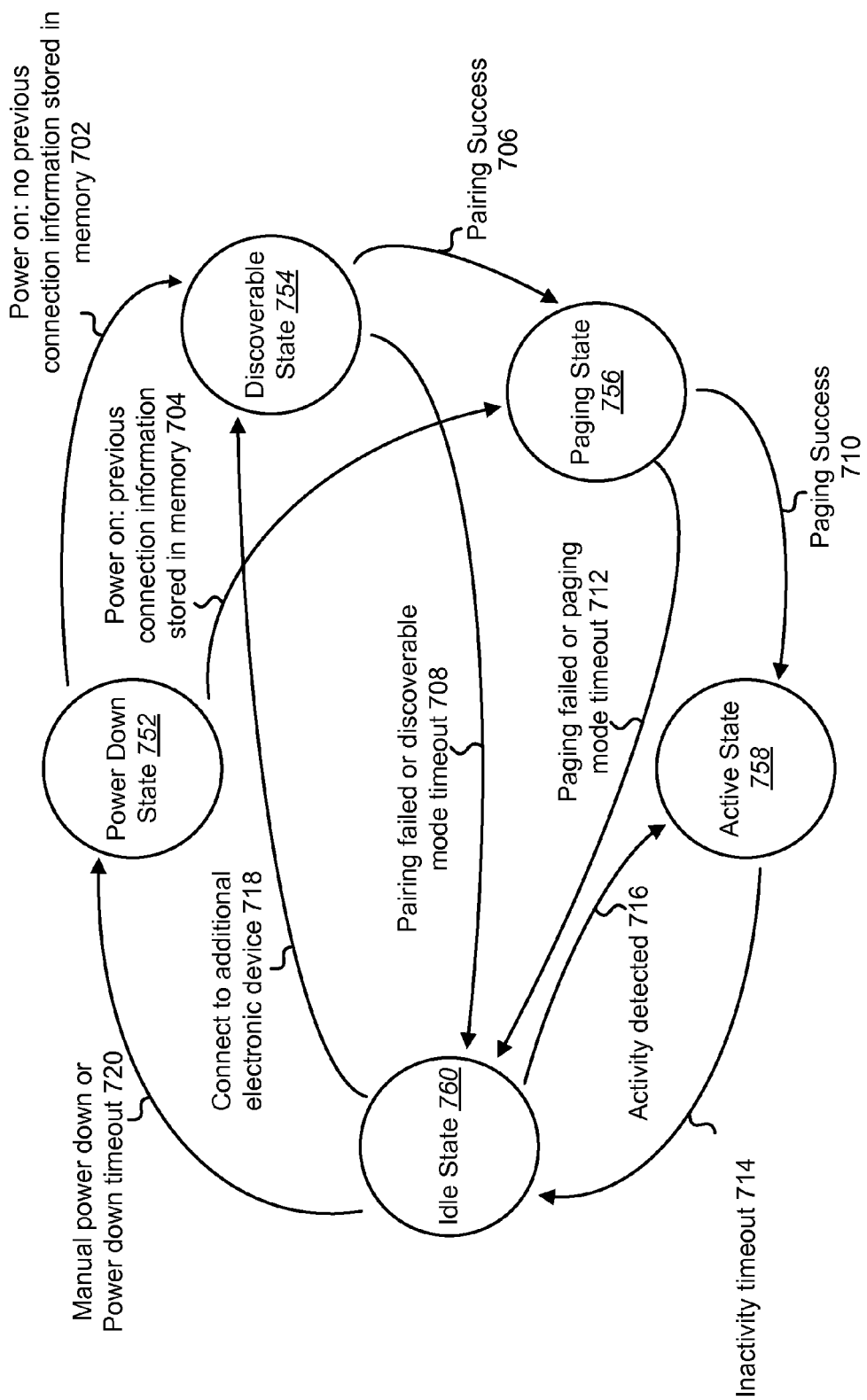
FIG. 7 is a state diagram illustrating transitions on a human interface device.

FIG. 7 is a state diagram illustrating transitions on a human interface device (HID) 304. The human interface device 304 may be an input device 104 as described in connection with FIG. 1. Additionally, the human interface device 304 may be the HID 304 described in connection with FIG. 3. As referred to in FIG. 7, the HID 304 is a Bluetooth input device, such as a Bluetooth keyboard 504a or a Bluetooth mouse 504b.

The HID 304 may be in a powered down state 752. In some instances, when the HID 304 powers on, there may be information corresponding to one or more previous connections with electronic devices stored in memory on the HID 304. However, in some cases, when the HID 304 powers on, there may be no information corresponding to any previous connections with electronic devices stored in memory.

If the HID 304 powers on 702 and there is information corresponding to one or more previous connections with electronic devices stored in memory on the HID 304, the HID 304 may enter into a discoverable state 754. If the HID 304 powers on 704 and there is no information corresponding to any previous connections with electronic devices stored in memory, the HID 304 may enter into a paging state 756.

In the discoverable state 754, the HID 304 may discover one or more electronic devices 102 to pair with. For example, the HID 304 may employ the discoverable state module 334 to communicate with electronic devices 102 that the HID 304 may connect with. In the discoverable state 754, the HID 304 may successfully pair 706 with an electronic device, such as a first electronic device 102a. Once paired with an electronic device 102, the HID 304 may enter into the paging state 756.

If the HID 304 powers on 702 and there is no information corresponding to one or more previous connections with electronic devices stored in memory on the HID 304, the HID 304 may enter into a discoverable state 754. If the HID 304 powers on 704 and there is information corresponding to any previous connections with electronic devices stored in memory, the HID 304 may enter into a paging state 756.

In the paging state 756, the HID 304 may attempt to connect with an electronic device 102 that it has previously been paired with. Information regarding the connections may be stored in memory. For example, the HID 304 may have stored in memory that a connection with a second electronic device 102b was the last active connection with the HID 304. The HID 304 may employ a paging state module 336 to page one or more electronic devices 102.

If the HID 304 successfully pages 710 a previously connected electronic device 102, then the HID 304 may enter an active state 758 with the previously connected electronic device 102. If the HID 304 fails 712 to page the previously connected electronic device 102, then the HID 304 may enter the idle state 760. Paging may fail 712 if the HID 304 is not able to connect with the selected electronic device 102. For example, if the HID 304 does not connect with the previously connected electronic device 102 before the paging state timer 344 expires, then the HID 304 may enter the idle state 760.

In the active state 758, the HID 304 may actively communicate with the selected electronic device 102 (e.g., the electronic device 102 with the active connection 322). In this manner, the HID 304 may send input data 328 to the actively connected electronic device 102. For example, if the HID 304 is actively connected to the first electronic device 102a, then input data 328 is sent to the first electronic device 102a.

After a period of time, the HID 304 may enter the idle state 760. For example, once activity on the HID 304 stops, such as user input, the HID 304 may initiate an inactivity timer 340. If the inactivity timer 340 expires or times out, then the HID 304 may enter the idle state 760. An activity status 338 on the HID 304 may track if the HID 304 is in the active state 758 or the idle state 760.

In the idle state 760, the HID 304 may reduce transmissions and power to conserve power and extend battery life. It should be appreciated that there may be many levels of granularity of power consumption within the idle state 760. In other words, in some configurations, the idle state 760 may refer to a low power mode where the HID 304 consumes power below the amount of power consumed in the active state 758. While in the idle state 760, the HID 304 may detect 716 activity, such as user input data 328. If the HID 304 detects 716 activity, the HID 304 may re-enter the active state 758.

If the HID 304 is in the idle state 760 and the HID 304 detects a command (e.g., from the new connection input 332) to connect 718 to an additional electronic device 102, such as a second electronic device 102b, the HID 304 may enter into the discoverable state 754. Then, the HID 304 may continue to the paging state 756 and connect with the second electronic device 102b, or the HID 304 may return to the idle state 760 if the HID 304 fails to pair or connect with the second electronic device 102b.

If the HID 304 is in the idle state 760 for more than a specified period of time (e.g., the power down timer 346 times out), then the HID 304 may enter the power down state 752. Additionally, the HID 304 may be manually powered down 720. The HID 304 may power down 720 to conserve power and extend battery life.

When entering the power down state 752, the HID 304 may store information corresponding to previous connections with electronic devices 102 in memory so that the HID 304 may quickly connect with a previously connected electronic device 102 when the HID 304 again powers on.

As an example, the HID 304 may be actively connected to the second electronic device 102b. The HID 304 may also be connected to the first electronic device 102a in a standby state. If the HID 304 powers down, information corresponding to the connection with the second electronic device 102b may be stored in memory. For example, the HID 304 may store in memory that the second electronic device 102b was the last electronic device 102 to be in the active state. The HID 304 may also store in memory information regarding the first electronic device 102a being connected in the standby state.

Once the HID 304 is powered on 704, the HID 304 may determine that there is information regarding previous connections stored in memory and that the second electronic device 102b should be connected as the active connection 322. Thus, the HID 304 may skip the discoverable state 754 and enter directly into the paging state 756 with the second electronic device 102b. The HID 304 may then enter the paging state 756 and successfully page 710 the second electronic device 102b to enter the active state 758 with the second electronic device 102b. The HID 304 may then send input data 328 to the second electronic device 102b. This cycle may be repeated.

Figure 8:
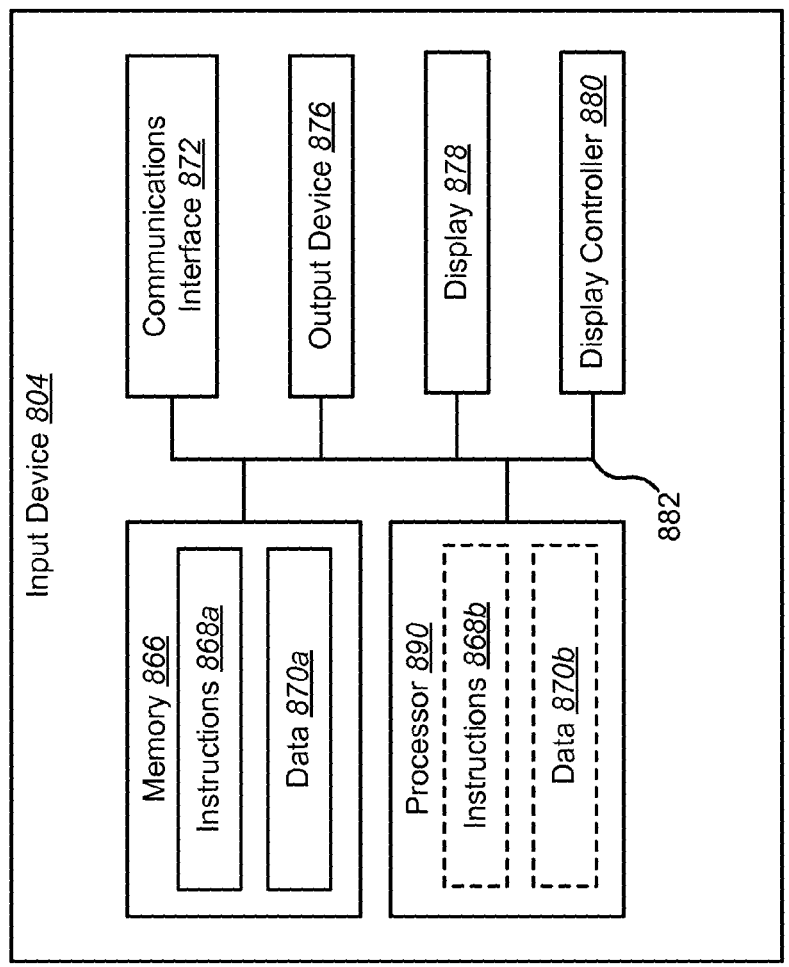
FIG. 8 illustrates various components that may be utilized in an input device.

FIG. 8 illustrates various components that may be utilized in an input device 804. The illustrated components may be located within the same physical structure or in separate housings or structures. The input device 804 may be configured similar to the one or more input devices 104, 304, 504a, 504b, described previously. The input device 804 includes a processor 890. The processor 890 may be a general purpose single- or multi-chip microprocessor (e.g., an ARM), a special purpose microprocessor (e.g., a digital signal processor (DSP)), a microcontroller, a programmable gate array, etc.

The processor 890 may be referred to as a central processing unit (CPU). Although just a single processor 890 is shown in the input device 804 of FIG. 8, in an alternative configuration, a combination of processors (e.g., an ARM and DSP) could be used.

The input device 804 may also include memory 866 in electronic communication with the processor 890. That is, the processor 890 can read information from and/or write information to the memory 866. The memory 866 may be any electronic component capable of storing electronic information. The memory 866 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 870a and instructions 868a may be stored in the memory 866. The instructions 868a may include one or more programs, routines, sub-routines, functions, procedures, etc. The instructions 868a may include a single computer-readable statement or many computer-readable statements. The instructions 868a may be executable by the processor 890 to implement one or more of the methods 300, 400 described above. Executing the instructions 868a may involve the use of the data 870a that is stored in the memory 866. FIG. 8 shows some instructions 868b and data 870b being loaded into the processor 890 (which may come from instructions 868a and data 870a).

The input device 804 may also include one or more communication interfaces 872 for communicating with other electronic devices. The communication interfaces 872 may be based on wired communication technology, wireless communication technology, or both. Examples of different types of communication interfaces 872 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, an IEEE 802.11 wireless communication adapter and so forth.

The input device 804 may also include one or more output devices 876. Examples of different kinds of output devices 876 include a speaker, printer, etc. One specific type of output device that may be typically included in an input device 804 is a display device 878. Display devices 878 used with configurations disclosed herein may utilize any suitable image projection technology, such as a cathode ray tube (CRT), liquid crystal display (LCD), light-emitting diode (LED), gas plasma, electroluminescence, or the like. A display controller 880 may also be provided for converting data stored in the memory 866 into text, graphics, and/or moving images (as appropriate) shown on the display device 878.

The various components of the input device 804 may be coupled together by one or more buses, which may include a power bus, a control signal bus, a status signal bus, a data bus, etc. For simplicity, the various buses are illustrated in FIG. 8 as a bus system 882. It should be noted that FIG. 8 illustrates only one possible configuration of an input device 804. Various other architectures and components may be utilized.

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any non-transitory tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, FIG. 4 and FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for using an input device simultaneously with multiple electronic devices, comprising:
    establishing a first connection with a first electronic device, wherein the first connection enters an active mode;
    establishing a second connection with a second electronic device, wherein the second connection enters the active mode;
    switching the first connection to a standby mode in response to the second connection entering the active mode;
    switching the first connection and the second connection between the active mode and the standby mode, wherein only one connection is in the active mode at a time;
    storing connection mode information corresponding to the first connection and connection mode information corresponding to the second connection when the input device transitions to a power down state; and
    restoring the connection mode of the first connection using the connection mode information corresponding to the first connection and the connection mode of the second connection using the connection mode information corresponding to the second connection when the input device transitions from the power down state to a paging state.

2. The method of claim 1, wherein the input device sends input data to the electronic device that is connected in the active mode.

3. The method of claim 1, wherein the input device is a Bluetooth input device.

4. The method of claim 1, wherein switching the first connection and the second connection between the active mode and the standby mode is triggered by selecting a single input on the input device.

5. The method of claim 1, further comprising:
    establishing a third connection with a third electronic device, wherein the third connection enters the active mode;
    switching the first connection and the second connection to the standby mode in response to the third connection entering the active mode; and
    switching the first connection, the second connection, and the third connection between the active mode and the standby mode, wherein only one connection is in the active mode at a time.

6. The method of claim 5, wherein switching the first connection, the second connection, and the third connection between the active mode and the standby mode is triggered by selecting a single input on the input device, wherein repeatedly selecting the single input cycles the input device through the first connection, the second connection, and the third connection.

7. The method of claim 1, further comprising:
    establishing a maximum number of connections; and one of:
    terminating an oldest connection when an additional connection is added; and
    terminating the connection that has not been in the active mode for a longest amount of time when an additional connection is added.

8. The method of claim 1, further comprising storing a first connection status flag corresponding to the first connection and a second connection status flag corresponding to the second connection, wherein each connection status flag indicates if the corresponding connection is in the active mode or the standby mode.

9. The method of claim 8, further comprising updating each connection status flag upon switching the first connection and the second connection between the active mode and the standby mode.

10. The method of claim 1, further comprising:
    buffering input data obtained on the input device while the first connection and the second connection switch between the active mode and the standby mode; and
    transmitting the buffered input data after the switch is completed.

11. The method of claim 1, further comprising transitioning from a power down state to a discoverable state when no connection mode information is stored on the input device.

12. The method of claim 1, further comprising transitioning from a discoverable state to a paging state when the input device successfully pairs with the electronic device that is trying to enter into the active mode with the input device, wherein the input device is a human interface device input device.

13. The method of claim 1, further comprising transitioning from a discoverable state to an idle state when a discoverable state timer expires.

14. The method of claim 1, further comprising transitioning from a discoverable state to an idle state when a pairing failure occurs with the electronic device that is trying to enter into the active mode with the input device, wherein the input device is a human interface device input device.

15. The method of claim 1, further comprising transitioning from a paging state to an idle state when one of a paging failure and a paging mode timeout occurs with the electronic device that is trying to enter into the active mode with the input device, wherein the input device is a human interface device input device.

16. The method of claim 1, further comprising transitioning to an active state when input data is detected.

17. The method of claim 16, further comprising transitioning from the active state to a discoverable state when an input on the input device is selected.

18. The method of claim 16, wherein the first electronic device is in the active mode, and further comprising transitioning the first electronic device from an idle state to a power down state when the first electronic device is powered down.

19. The method of claim 18, further comprising automatically switching the second connection from the standby mode to the active mode when the first electronic device is powered down.

20. The method of claim 1, further comprising:
maintaining the first connection with the first electronic device in the standby mode, wherein the input device does not send input data to the first electronic device; and
maintaining the second connection with the second electronic device in the active mode, wherein the input device sends input data to the second electronic device.

21. An input device configured to simultaneously communicate with multiple electronic devices, comprising:
a processor;
memory in electronic communication with the processor;
instructions stored in the memory, the instructions being executable to:
establish a first connection with a first electronic device, wherein the first connection enters an active mode;
establish a second connection with a second electronic device, wherein the second connection enters the active mode;
switch the first connection to a standby mode in response to the second connection entering the active mode;
switch the first connection and the second connection between the active mode and the standby mode, wherein only one connection is in the active mode at a time;
store connection mode information corresponding to the first connection and connection mode information corresponding to the second connection when the input device transitions to a power down state; and
restore the connection mode of the first connection using the connection mode information corresponding to the first connection and the connection mode of the second connection using the connection mode information corresponding to the second connection when the input device transitions from the power down state to a paging state.

22. The input device of claim 21, wherein the input device sends input data to the electronic device that is connected in the active mode.

23. The input device of claim 21, further comprising instructions being executable to:
establish a third connection with a third electronic device, wherein the third connection enters the active mode;
switch the first connection and the second connection to the standby mode in response to the third connection entering the active mode; and
switch the first connection, the second connection, and the third connection between the active mode and the standby mode, wherein only one connection is in the active mode at a time.

24. The input device of claim 23, wherein switching the first connection, the second connection, and the third connection between the active mode and the standby mode is triggered by selecting a single input on the input device, wherein repeatedly selecting the single input cycles the input device through the first connection, the second connection, and the third connection.

25. The input device of claim 21, further comprising instructions being executable to store a first connection status flag corresponding to the first connection and a second connection status flag corresponding to the second connection, wherein each connection status flag indicates if the corresponding connection is in the active mode or the standby mode.

26. The input device of claim 21, further comprising instructions being executable to transition from a power down state to a discoverable state when no connection mode information is stored on the input device.

27. The input device of claim 21, further comprising instructions being executable to transition from a discoverable state to an idle state when a discoverable state timer expires.

28. The input device of claim 21, further comprising instructions being executable to transition from a paging state to an idle state when one of a paging failure and a paging mode timeout occurs with the electronic device that is connected in the active mode.

29. The input device of claim 21, further comprising instructions being executable to:
maintain the first connection with the first electronic device in the standby mode, wherein the input device does not send input data to the first electronic device; and
maintain the second connection with the second electronic device in the active mode, wherein the input device sends input data to the second electronic device.

30. A non-transitory tangible computer-readable medium having instructions thereon, the instructions comprising:
code for causing the input device to establish a first connection with a first electronic device, wherein the first connection enters an active mode;
code for causing the input device to establish a second connection with a second electronic device, wherein the second connection enters the active mode;
code for causing the input device to switch the first connection to a standby mode in response to the second connection entering the active mode;
code for causing the input device to switch the first connection and the second connection between the active mode and the standby mode, wherein only one connection is in the active mode at a time;
code for causing the input device to store connection mode information corresponding to the first connection and connection mode information corresponding to the second connection when the input device transitions to a power down state; and
code for causing the input device to restore the connection mode of the first connection using the connection mode information corresponding to the first connection and the connection mode of the second connection using the connection mode information corresponding to the second connection when the input device transitions from the power down state to a paging state.

31. The non-transitory tangible computer-readable medium of claim 30, wherein the input device sends input data to the electronic device that is connected in the active mode.

32. The non-transitory tangible computer-readable medium of claim 30, further comprising code for causing the input device to:

establish a third connection with a third electronic device, wherein the third connection enters the active mode;

switch the first connection and the second connection to the standby mode in response to the third connection entering the active mode; and switch the first connection, the second connection, and the third connection between the active mode and the standby mode, wherein only one connection is in the active mode at a time.

33. The non-transitory tangible computer-readable medium of claim 32, wherein switching the first connection, the second connection, and the third connection between the active mode and the standby mode is triggered by selecting a single input on the input device, wherein repeatedly selecting the single input cycles the input device through the first connection, the second connection, and the third connection.

34. The non-transitory tangible computer-readable medium of claim 30, further comprising code for causing the input device to store a first connection status flag corresponding to the first connection and a second connection status flag corresponding to the second connection, wherein each connection status flag indicates if the corresponding connection is in the active mode or the standby mode.

35. The non-transitory tangible computer-readable medium of claim 30, further comprising code for causing the input device to transition from a power down state to a discoverable state when no connection mode information is stored on the input device.

36. The non-transitory tangible computer-readable medium of claim 30, further comprising code for causing the input device to transition from a discoverable state to an idle state when a discoverable state timer expires.

37. The non-transitory tangible computer-readable medium of claim 30, further comprising code for causing the input device to transition from a paging state to an idle state when one of a paging failure and a paging mode timeout occurs with the electronic device that is connected in the active mode.

38. The non-transitory tangible computer-readable medium of claim 30, further comprising code for causing the input device to:

maintain the first connection with the first electronic device in the standby mode, wherein the input device does not send input data to the first electronic device; and maintain the second connection with the second electronic device in the active mode, wherein the input device sends input data to the second electronic device.

39. An apparatus for simultaneously communicating with multiple electronic devices, further comprising:

means for establishing a first connection with a first electronic device, wherein the first connection enters an active mode;

means for establishing a second connection with a second electronic device, wherein the second connection enters the active mode;

means for switching the first connection to a standby mode in response to the second connection entering the active mode;

means for switching the first connection and the second connection between the active mode and the standby mode, wherein only one connection is in the active mode at a time;

means for storing connection mode information corresponding to the first connection and connection mode information corresponding to the second connection when the input device transitions to a power down state; and means for restoring the connection mode of the first connection using the connection mode information corresponding to the first connection and restoring the connection mode of the second connection using the connection mode information corresponding to the second connection when the input device transitions from the power down state to a paging state.

40. The apparatus of claim 39, wherein the apparatus sends input data to the electronic device that is connected in the active mode.

41. The apparatus of claim 39, further comprising:

means for establishing a third connection with a third electronic device, wherein the third connection enters the active mode;

means for switching the first connection and the second connection to the standby mode in response to the third connection entering the active mode; and means for switching the first connection, the second connection, and the third connection between the active mode and the standby mode, wherein only one connection is in the active mode at a time.

42. The apparatus of claim 41, wherein means for switching the first connection, the second connection, and the third connection between the active mode and the standby mode is triggered by selecting a single input on the apparatus, wherein repeatedly selecting the single input cycles the apparatus through the first connection, the second connection, and the third connection.

43. The apparatus of claim 39, further comprising means for storing a first connection status flag corresponding to the first connection and a second connection status flag corresponding to the second connection, wherein each connection status flag indicates if the corresponding connection is in the active mode or the standby mode.

44. The apparatus of claim 39, further comprising means for transitioning from a power down state to a discoverable state when no connection mode information is stored on the apparatus.

45. The apparatus of claim 39, further comprising means for transitioning from a discoverable state to an idle state when a discoverable state timer expires.

46. The apparatus of claim 39, further comprising means for transitioning from a paging state to an idle state when one of a paging failure and a paging mode timeout occurs with the electronic device that is connected in the active mode.

47. The apparatus of claim 39, further comprising:

means for maintaining the first connection with the first electronic device in the standby mode, wherein the apparatus does not send input data to the first electronic device; and means for maintaining the second connection with the second electronic device in the active mode, wherein the apparatus sends input data to the second electronic device.

* * * * *